Sept. 17, 1957     J. MOELLER     2,806,408
ELECTRICALLY OPERATED REAR VIEW MIRROR
Filed Oct. 11, 1956

INVENTOR.
JOHN MOELLER
BY
Carl Miller
ATTORNEY

# United States Patent Office 2,806,408
Patented Sept. 17, 1957

2,806,408

ELECTRICALLY OPERATED REAR VIEW MIRROR

John Moeller, Bremerton, Wash.

Application October 11, 1956, Serial No. 615,303

3 Claims. (Cl. 88—77)

This invention relates to rear view mirrors for automobiles and, more particularly, to mirrors having electrically operated adjustment mechanisms.

The light from the headlights of rearwardly approaching vehicles that is ordinarily reflected into the eyes of the driver of a leading vehicle by the rear view mirror thereof is usually quite hazardous as well as uncomfortable. The glare produced by such reflected light often blinds the driver to on-coming traffic and vehicles along the side of the roadway. An object of this invention, therefore, is to provide a rear view mirror for vehicles that may be selectively adjusted between predetermined positions that is simple in construction, efficient in operation, and which will overcome the aforementioned difficulties.

Another object of this invention is to provide a rear view mirror that is adjusted by means of solenoids energized from the vehicle power supply and which may be moved from one position to another by acuation of a foot switch.

All of the foregoing as well as additional objects and advantages of this invention will become apparent from a study of the specification, taken in connection with the accompanying drawing, wherein.

Figure 1:
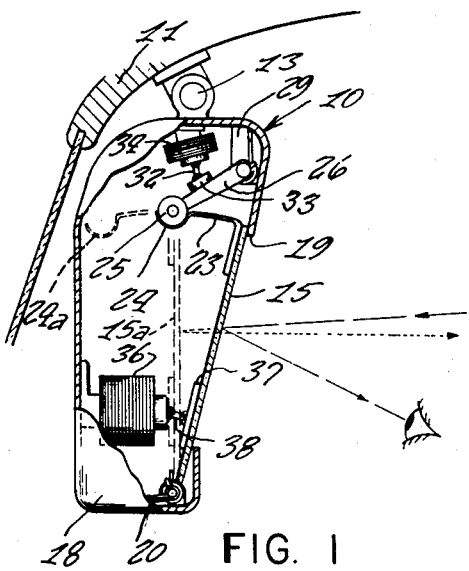
Figure 1 is a cross-sectional view of a rear view mirror made in accordance with the present invention.
Figure 2:
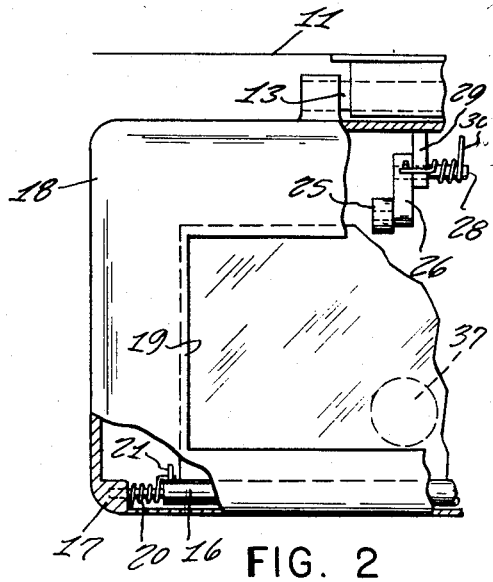
Figure 2 is a fragmentary side elevational view of the device shown in Figure 1.

Referring now to Figure 1 of the drawing, a rear view mirror assembly 10 made in accordance with the present invention is shown secured within the roof 11 of the vehicle by means of an adjustable pivot 13. The reflecting surface or mirror 15 is supported at its lower end upon a shaft 16 that is rotatably secured in bearings 17 at the lower portion of the housing 18. This mirror 15 is visible to the driver of the vehicle through a rectangular aperture 19 in the housing. A torsion spring 20, normally biasing the mirror to the inclined position as shown in full lines in Figure 1, is seated at one end on the housing 18, and at the other end against a pin 21 carried by the rotatable shaft 16. One end of a horizontal plate 23 is secured to the upper end of the mirror 15, the other end of which is in the shape of a concave seat 24 that removably receives a roller 25 rotatably supported at one end of a lever 26. The other end of this lever is secured to a rotatable shaft 28 that is journaled in a downwardly depending bracket 29 of the housing. A torsion spring 30 seated at the one end against the housing, encircles the shaft 28 and abuts a pin 31 at the adjacent end of the lever 26 and normally urges the roller 25 in a downward direction.

A short connecting link 32 is connected at one end to a plate 33 secured to the mid-portion of the lever 26 and is connected at its opposite end to the plunger of a solenoid 34 that is secured within the housing. A somewhat larger solenoid 36 is supported adjacent to the lower end of the housing and has its plunger connected to a plate 37 secured to the rear side of the mirror 15 by means of a similar link 38.

Figure 3:
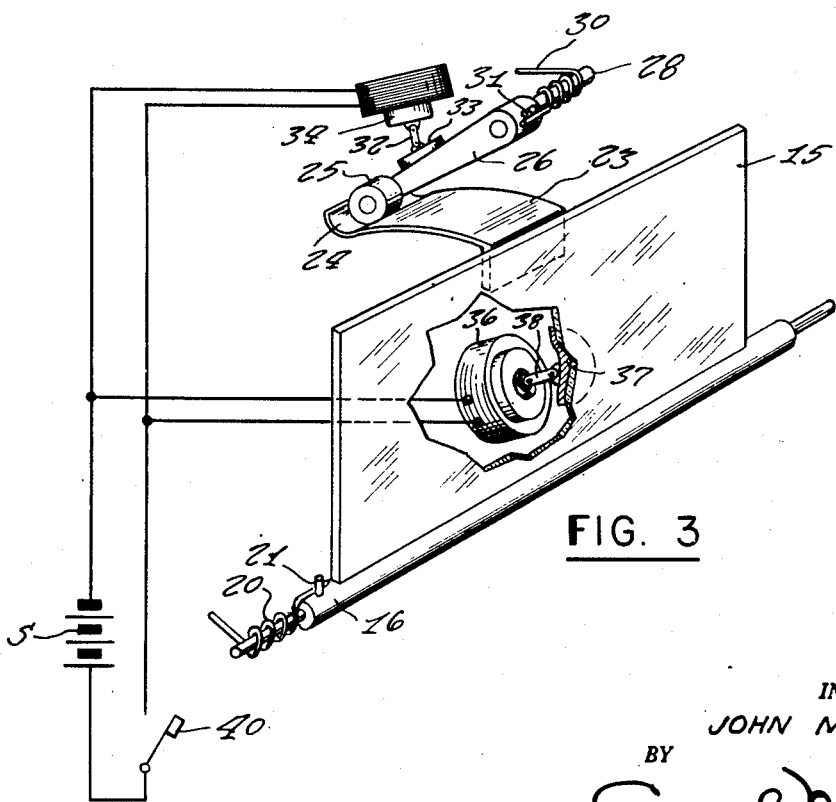
Figure 3 is an isometric view of the device shown in Figure 1, illustrating the mechanical features and showing the electrical circuit diagram thereof.

As is more clearly shown in Figures 3, the closing of the foot switch 40, which may be located in any convenient place in the vehicle, closes the electrical circuit through the battery S of the vehicle. Both solenoids 34, 36, are connected in parallel with the series connected battery and switch so that closing the switch 40 is operative to simultaneously energizing both solenoids. Energization of the released solenoid 34 is effective to raise the roller 25 out of securing engagement in the recess 24, to permit the mirror 15 to be pivoted from its normal position 15 to a vertical position 15a by retraction of the solenoid 36. Opening the switch 40 deenergizes the solenoids 34, 36, whereupon the roller 25 drops into rolling engagement with the upper surface of the plate 23 while the torsion spring 20 returns the mirror 15 to its initial position, after which the torsion spring 30 is operative to cause the roller 25 to drop into engagement with the recess 24, thereby resiliently retaining the mirror in this position. As shown in Figure 1, the light ordinarily entering the eye of the driver during the normal position of the mirror 15, is reflected above the driver's eye level when the mirror is moved to its vertical position 15a. Because of the positive action of the respective parts, including the torsion spring means, all of the parts are maintained in positive engagement so that there is a minimum of looseness and rattling, as well as the desired positive actuation of the unit.

While this invention has been described with particular reference to the specific form shown in the drawing, it is to be understood that such is not to be construed as imparting limitations upon the invention, which is best defined by the claims appended hereto.

Having thus described my invention, I claim as new and desire to secure by Letters Patent:

1. A rear view mirror for vehicles comprising, in combination, a housing, a mirror rotatably secured at one end within said housing, spring means normally biasing said mirror towards one extreme position within said housing, a recessed positioning plate secured to the opposite end of said mirror, an actuating lever pivotally carried within said housing adjacent to said plates, said lever rotatably supporting a roller adjacent to the recess of said plate, spring means normally biasing said roller into releasable engagement with said recess, a first solenoid carried within said housing and connected to said lever for effecting movement thereof against the action of said lever associated spring means, a second solenoid carried within said housing and connected to said mirror for effecting limited movement thereof against the action of said mirror associated spring means, operatnig means for simultaneously energizing said first and second solenoids, energization of said first solenoid being operative to effect disengagement of said roller with said recess, and energization of said second solenoid being operative to rotate said mirror about said one end.

2. A rear view mirror as set forth in claim 1, wherein said operating means is operative to selectively effect simultaneous deenergization of both of said solenoids.

3. A rear view mirror as set forth in claim 2, wherein said lever is pivoted at one end to said housing adjacent to said opposite end of said mirror, said roller being secured to the opposite end of said lever, and said solenoid being connected to said lever intermediate said ends thereof.

No references cited.